(12) United States Patent
Taniguchi et al.

(10) Patent No.: US 7,506,182 B2
(45) Date of Patent: Mar. 17, 2009

(54) VEHICLE-MOUNTED POWER SUPPLY SYSTEM

(75) Inventors: Makoto Taniguchi, Oobu (JP); Katsunori Tanaka, Haguri-gun (JP)

(73) Assignee: Denso Corporation, Kariya (JP)

( * ) Notice: Subject to any disclaimer, the term of this patent is extended or adjusted under 35 U.S.C. 154(b) by 372 days.

(21) Appl. No.: 11/196,675

(22) Filed: Aug. 4, 2005

(65) Prior Publication Data

US 2006/0041765 A1 Feb. 23, 2006

(30) Foreign Application Priority Data

Aug. 23, 2004 (JP) ............................. 2004-241777

(51) Int. Cl.
*B50K 1/00* (2006.01)
*G01R 31/36* (2006.01)

(52) U.S. Cl. ........................... 713/300; 322/10; 322/16; 318/139; 701/22; 307/10.6

(58) Field of Classification Search ................. 713/300; 722/10, 16; 318/139; 701/22; 307/10.6
See application file for complete search history.

(56) References Cited

U.S. PATENT DOCUMENTS

| | | | |
|---|---|---|---|
| 5,285,862 A * | 2/1994 | Furutani et al. | 180/65.4 |
| 5,977,744 A * | 11/1999 | Williams et al. | 320/104 |
| 6,437,462 B1 * | 8/2002 | Maple et al. | 307/75 |
| 6,546,320 B2 * | 4/2003 | Shimizu et al. | 701/22 |
| 6,668,954 B2 * | 12/2003 | Field | 180/65.2 |
| 6,936,934 B2 * | 8/2005 | Morimoto et al. | 307/9.1 |
| 2002/0109407 A1 * | 8/2002 | Morimoto et al. | 307/10.1 |

FOREIGN PATENT DOCUMENTS

| | | |
|---|---|---|
| JP | A 06-296332 | 10/1994 |
| JP | A 2002-238103 | 8/2002 |
| JP | A-2003-319695 | 11/2003 |
| JP | A 2004-328988 | 11/2004 |
| JP | A 2004-350426 | 12/2004 |

OTHER PUBLICATIONS

Japanese Office Action issued in Patent Application No. 2004-241777, Jun. 3, 2008.

* cited by examiner

*Primary Examiner*—Abdelmoniem Elamin
(74) *Attorney, Agent, or Firm*—Oliff & Berridge, PLC (57) ABSTRACT

In a vehicle-mounted power supply system, the automotive generator generates a voltage for charging a first battery. Power conversion circuitry is connected between the first battery and a second battery that is connected to an electrical load to operate in a first mode or in a second mode when power consumption of the load is lower or higher than a specified value, respectively. In the first mode, the power conversion circuitry maintains the voltage at the second battery at a substantially constant level and in the second mode, the voltage at the second battery varies with the voltage at the first battery. In response to a vehicle speed variation, the automotive generator is controlled so that its output voltage is varied at a first rate when power conversion is performed in the first mode and varied at a second rate lower than the first rate when power conversion is performed in the second mode.

12 Claims, 5 Drawing Sheets

LEGEND:
FIRST MODE: TR 36 = VARIABLE GAIN
SECOND MODE A: SW 4 = OFF, TR 36 = FIXED AT UNITY GAIN
SECOND MODE B: SW 4 = ON, TR 36 = FIXED AT EITHER UNITY OR ZERO GAIN

VEHICLE-MOUNTED POWER SUPPLY SYSTEM

CROSS-REFERENCE TO RELATED APPLICATION

This application is based on Japanese Patent Application 2004-241777, filed Aug. 23, 2004, which is hereby incorporated by reference.

BACKGROUND OF THE INVENTION

1. Field of the Invention

The present invention relates to a vehicle-mounted power supply system for charging a storage battery and supplying power to electrical loads.

2. Description of the Related Art

As disclosed in Japanese Patent Publications 6-296332 and 2002-238103, a vehicle-mounted power supply system is controlled to generate electricity according to the driving condition of the vehicle for improving fuel consumption and emission of noxious gases. In particular, the vehicle-mounted power supply system is operated in different modes according to the driving condition of the vehicle. During deceleration, power regeneration is performed by converting the momentum of the vehicle to electric energy and returning it to a storage battery, and during acceleration, power generation is shutdown to utilize the recaptured electric energy instead of generating power. The vehicle-mounted power supply system usually comprises a first storage battery charged by an automotive generator and a second storage battery connected to an electrical load. A power converter is provided between the first and second storage batteries. Voltage variations can occur in the second storage battery depending on the amount of electrical load of the vehicle. The power converter monitors the voltage of the second battery and adaptively controls the amount of electric power transferred from the first battery to the second battery when the monitored voltage deviates from a reference voltage. The power converter operates successfully to maintain the second battery voltage at a substantially constant level if the amount of electrical power consumption is within its adaptive control range.

However, intermittent power regeneration and shutdown could produce a large variation in the electrical power consumption of the vehicle and such variation could eventually exceed beyond the adaptive control range of the power converter. Thus, the voltage supplied to the headlights and air-conditioning system will undergo large variations, causing such unfavorable situations as fluctuating illumination and varying blower-motor speed. The problem may be overcome by increasing the adaptive control range of the power converter. However, it only adds to the size and capacity of the power converter. Additionally, such unfavorable situations may be avoided by preventing the power supply system from operating in power-shutdown and regeneration modes. However, the advantageous features of less fuel consumption and reduced emission of harmful gases would be lost.

Therefore, a need does exist to provide a vehicle-mounted power supply system capable of supplying a constant power voltage to electrical loads under varying vehicle-operating conditions.

SUMMARY OF THE INVENTION

It is therefore an object of the present invention to provide a vehicle-mounted power supply system capable of producing a constant voltage under varying operating conditions of the vehicle.

Another object of the present invention is to provide a vehicle-mounted power supply system capable of supplying a constant voltage under different operating conditions of the vehicle while ensuring less fuel consumption and reduced emission of harmful gases.

A further object of the present invention is to provide a vehicle-mounted power supply system that allows compact design for vehicle-mounted power converters.

According to a first aspect of the present invention, there is provided a power supply system mounted on a vehicle, comprising a first storage battery, an automotive generator for generating a voltage and charging the first storage battery with the generated voltage, a second storage battery connected to an electrical load, and power conversion circuitry connected between the first storage battery and the second storage battery, the power conversion circuitry being operable in a first mode in which a voltage at the second storage battery is maintained at a substantially constant level and in a second mode in which the voltage at the second storage battery varies with a voltage at the first storage battery. A controller is provided for operating the power conversion circuitry in the first mode when power consumption of the electrical load is lower than a specified value and controlling the generator so that the generated voltage undergoes a transition at a first rate, and operating the power conversion circuitry in the second mode when power consumption of the electrical load is higher than the specified value and controlling the generator so that the generated voltage undergoes a transition at a second rate lower than the first rate.

According to a second aspect, the present invention provides a method of operating a power supply system mounted on a vehicle, wherein the system comprises a first storage battery, an automotive generator for generating a voltage for charging the first storage battery, a second storage battery connected to an electrical load and power conversion circuitry connected between the first storage battery and the second storage battery, the method comprising the steps of (a) operating the power conversion circuitry in a first mode when power consumption of the electrical load is lower than a specified value so that a voltage at the second storage battery is substantially maintained at a constant level and operating the power conversion circuitry in a second mode when the power consumption is higher than the specified value so that the voltage at the second storage battery varies with a voltage at the first storage battery, and (b) controlling the automotive generator so that the generated voltage undergoes a transition at a first rate when the power conversion circuitry is operating in the first mode and undergoes a transition at a second rate lower than the first rate when the power conversion circuitry is operating in the second mode.

BRIEF DESCRIPTION OF THE DRAWINGS

The present invention will be described in detail with reference to the following drawings, in which.

DETAILED DESCRIPTION

Figure 1:
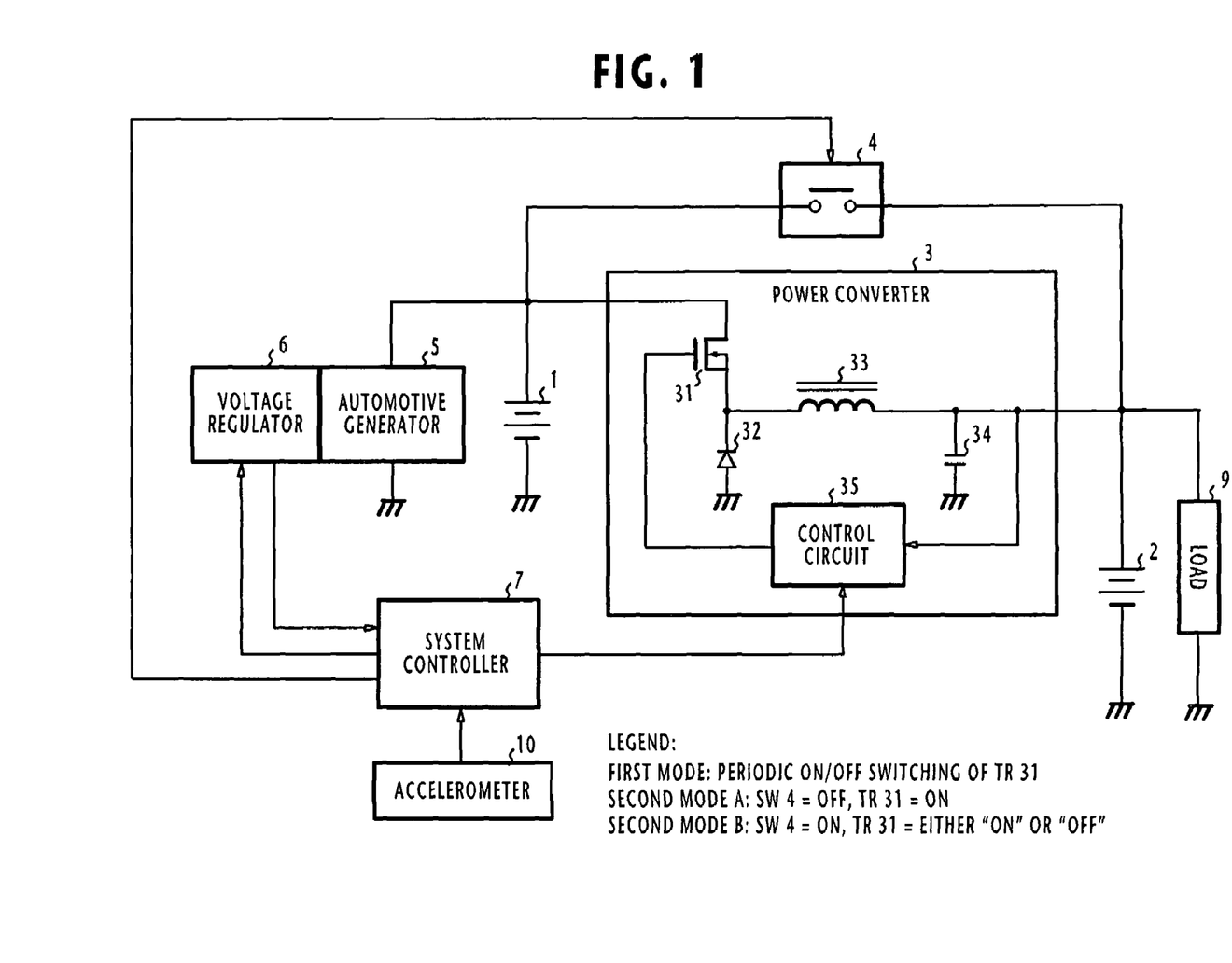
FIG. 1 is a block diagram of a vehicle-mounted power supply system according to a first embodiment of the present invention.

In FIG. 1, a vehicle-mounted power supply system according to one embodiment of the present invention is illustrated. The power supply system comprises two lead-acid batteries 1 and 2. Battery 2 supplies a current to a load circuit 9 and the battery 1 is charged by an automotive generator 5 to a rated voltage higher than the rated voltage of battery 2. Connected between the batteries 1 and 2 is a power converter 3 that performs one-way power conversion from the battery 1 to battery 2. As an option, a switch 4 is connected in parallel with the power converter 3. Preferably, the switch 4 is implemented with a power transistor that is advantageous over the use of a mechanically operated switch that suffers from the well-known bouncing effect, which can result in the generation of a large current.

Power converter 3 and switch 4 constitute power conversion circuitry. Depending on power consumption of the electrical load 9, the power conversion circuitry operates in one of first and second modes. In the first (conversion) mode, the power conversion circuitry operates according to the voltage of battery 2 so that the latter is maintained at a substantially constant level. In the second (straight-circuit) mode, the power conversion circuitry suspends its power conversion function and establishes a straight circuit so that the voltage of battery 2 varies with the voltage of battery 1.

A voltage regulator 6 controls the output voltage of the automotive generator 5 at a substantially constant level by regulating its field coil current according to a control signal supplied from a system controller 7.

Automotive generator 5 provides conversion of the mechanical energy of the vehicle to electrical energy and charges the battery 1 with the generated energy. An accelerometer 10 supplies a signal to the system controller 7 for indicating a vehicle speed variation.

In a manner as will be described, the system controller 7 monitors power ratio data and other information supplied from the voltage regulator 6 and determines the magnitude of power consumption of electrical load 9. In addition to the load power determination, the system controller 7 monitors the vehicle speed signal supplied from the accelerometer 10 to detect when an vehicle speed variation occurs.

One example of the power converter 3 is a DC-DC converter that comprises a switching power transistor 31, a flywheel diode 32, an inductor 33, a smoothing capacitor 34, and a control circuit 35. Switching power transistor 31 has its drain connected to the battery 1 and its source connected to one terminal of the inductor 33, the other end of inductor 3 being connected to the battery 2.

Control circuit 35 generates a train of pulses of variable duration at a predetermined frequency (in the range between several tens of Hz and 100 kHz) and drives the transistor 31 into conduction at periodic intervals, which results in high frequency oscillations through the inductor 33 and capacitor 34 to ground. During a first half-cycle of each oscillation, current flows through the capacitor 34 and diode 32 that charges the capacitor, and during the next half-cycle, the current which would otherwise flow in the opposite direction is blocked by the diode 32. As the process is continued, the capacitor 34 is charged with a DC voltage. Control circuit 35 operates in a pulse-width modulation mode by monitoring the voltage across the capacitor 34 and controlling the width (or duty ratio) of the driving pulses according to a difference between the monitored capacitor voltage and a fixed reference voltage so that the difference is reduced to zero. As a result, the DC voltage across the capacitor 34 is maintained at a substantially constant level.

Note that the power converter 3 and the switch 4 constitute power conversion circuitry that operates in one of the first and second modes according to a command signal supplied from the system controller 7, depending on the electrical power consumption.

According to the monitored signals, the system controller 7 controls the power conversion circuitry by operating it in one of the first and second modes depending on the determined power consumption of the electrical load 9.

Specifically, when the load power consumption is lower than a specified value, the system controller 7 sets the power conversion circuitry in the first (power conversion) mode in which the switch 4 is turned OFF and the power converter 3 operates normally so that the voltage at battery 2 is maintained constant. When the load power consumption is higher than the specified value, the system controller 7 sets the power conversion circuitry in the straight-circuit mode using one of the following alternative settings:

1) Switch 4=OFF and transistor 31=ON; and
2) Switch 4=ON and transistor 31 is either ON or OFF.

With the alternative setting (1), the switch 4 is turned OFF and transistor 31 is set in the ON state to allow passage of DC current from the battery 1 to the battery 2 through the inductor 33. With the alternative setting (2), the switch 4 is turned ON and transistor 31 is either set in the ON or OFF state. If the transistor 31 is turned ON in the second alternative setting, parallel current flows through the switch 4 and inductor 33. If the transistor 31 is turned OFF in the second alternative setting, current flows only through the switch 4.

The output voltage of the generator 5 is set by regulator 6 at one of high, medium and low target levels (15.5 volts, 14.5 volts and 12 volts, respectively). When the vehicle is cruising at a constant speed, the target voltage of the generator 5 is set at the medium level of 14.5 volts.

Figure 2:
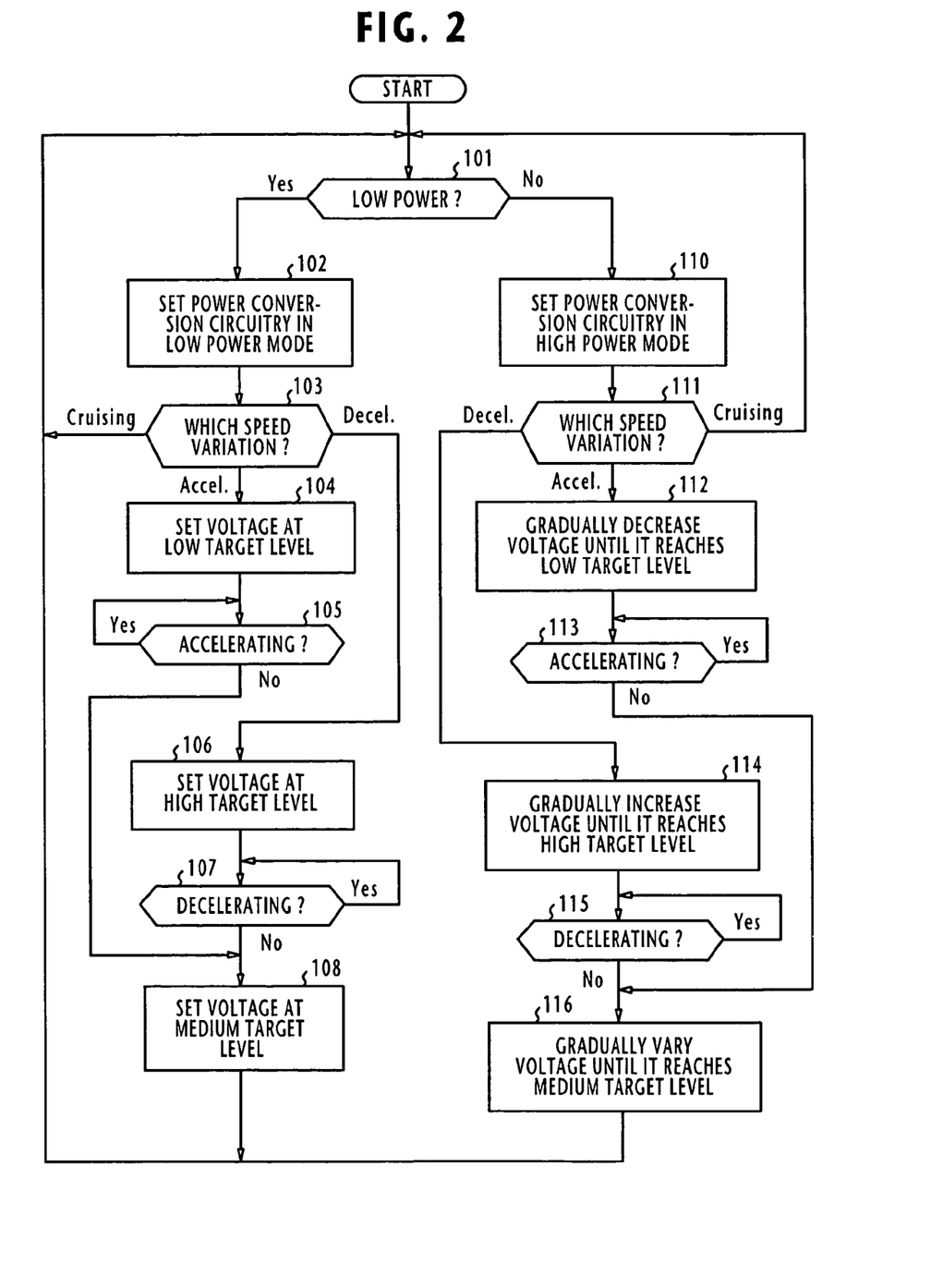
FIG. 2 is a flowchart of the operation of the system controller of FIG. 1.

According to the flowchart of FIG. 2, the system controller 7 performs a routine starting with step 101 by checking the data supplied from the voltage regulator 6 to determine whether the power consumption of the electrical load 9 is higher or lower than a specified value.

If the determined power consumption is lower than the specified value, the controller 7 operates the power conversion circuitry in the normal power conversion mode (first mode) (step 102). In this mode, the switch 4 is set in the OFF state. If the determined power consumption is higher than the specified value, the power conversion circuitry is set in a straight-circuit mode (second mode) (step 110) as described above.

During the normal power conversion mode (step 102), the battery 2 is charged through the power converter 3 and the voltage of this battery is maintained at a substantially constant level. Controller 7 proceeds to step 103 to examine the output of the accelerometer 10 and determines if there is a speed variation of the vehicle. If there is none, flow returns to step 101 to repeat the process.

If the controller 7 detects a speed variation indicating that the vehicle is accelerated, flow proceeds from step 103 to step 104 to control the voltage regulator 6 to set the target voltage of the generator 5 to a low level of 12 volts. With this setting, the output voltage of generator 5 drops sharply from the medium target level of 14.5 volts to 12 volts. This setting may be done by causing the generator 5 to stop generating electricity, so that the input voltage to the power converter 3 is supplied solely from the battery 1.

Flow proceeds to step 105 to check to see if the vehicle is still accelerated. If the acceleration has been stopped, the decision at step 105 is negative and the controller 7 proceeds to step 108 to activate the generator 5 and sets its output voltage at the medium target level of 14.5 volts, and returns to step 101.

If the decision at step 103 indicates that the vehicle is decelerated, flow proceeds to step 106 to set the generator 5 at the high target voltage of 15.5 volts. As a result, the output voltage of generator 5 sharply rises from the medium target level to the high target level. At decision step 107, the controller 7 determines if the deceleration still continues. If the vehicle operation changes from deceleration to a constant cruising speed (step 107), flow proceeds to step 108 to set the automotive generator 5 at the medium target voltage, so that its output voltage sharply drops from the high target level to the medium target level. During the time the vehicle is driven at constant speed, steps 101, 102 and 103 are repeated to monitor the power consumption of electrical load 9 and the output of accelerometer 10, while the output of generator 5 is maintained at the medium target level.

If power consumption of electrical load 9 rises above the specified value, the decision at step 101 is negative and flow proceeds to step 110 to set the power conversion circuitry in the straight-circuit mode so that a low-impedance path is established between the battery 1 and the battery 2. At subsequent step 111, the output of accelerometer 10 is examined. If the vehicle is accelerated, flow proceeds to step 112 to control the voltage regulator 6 so that the generator output voltage gradually decreases at a predetermined rate until it reaches the low target voltage. When the low target voltage is reached, the controller 7 sets the generator 5 in an inactive state. Flow proceeds to decision step 113 to check the accelerometer 10. If the vehicle speed changes from acceleration to cruising, the decision at step 113 is negative and the controller 7 proceeds to step 116. At step 116, the controller 7 activates the voltage regulator 6 so that it gradually increases the output voltage of generator 5 at a predetermined rate from the low target level until it reaches the medium target level, and returns to step 101 to repeat the process.

If the decision at step 111 indicates that the vehicle is decelerated, flow proceeds to step 114 to control the voltage regulator 6 so that the output voltage of generator 5 gradually increases at a predetermined rate until it reaches the high target level of 15.5 volts, and proceeds to decision step 115. When the vehicle operation changes deceleration to cruising (step 115), it is determined that the vehicle is now cruising and flow proceeds to step 116 to control the voltage regulator 6 so that the output of generator 5 gradually decreases at a predetermined rate from the high target level to the medium target level, and returns to step 101. When the vehicle continues cruising, steps 101, 110 and 111 is repeated to monitor the power consumption of load 9 and the output of accelerometer 10, while the output of generator 5 is maintained at the medium target level.

Figure 3:
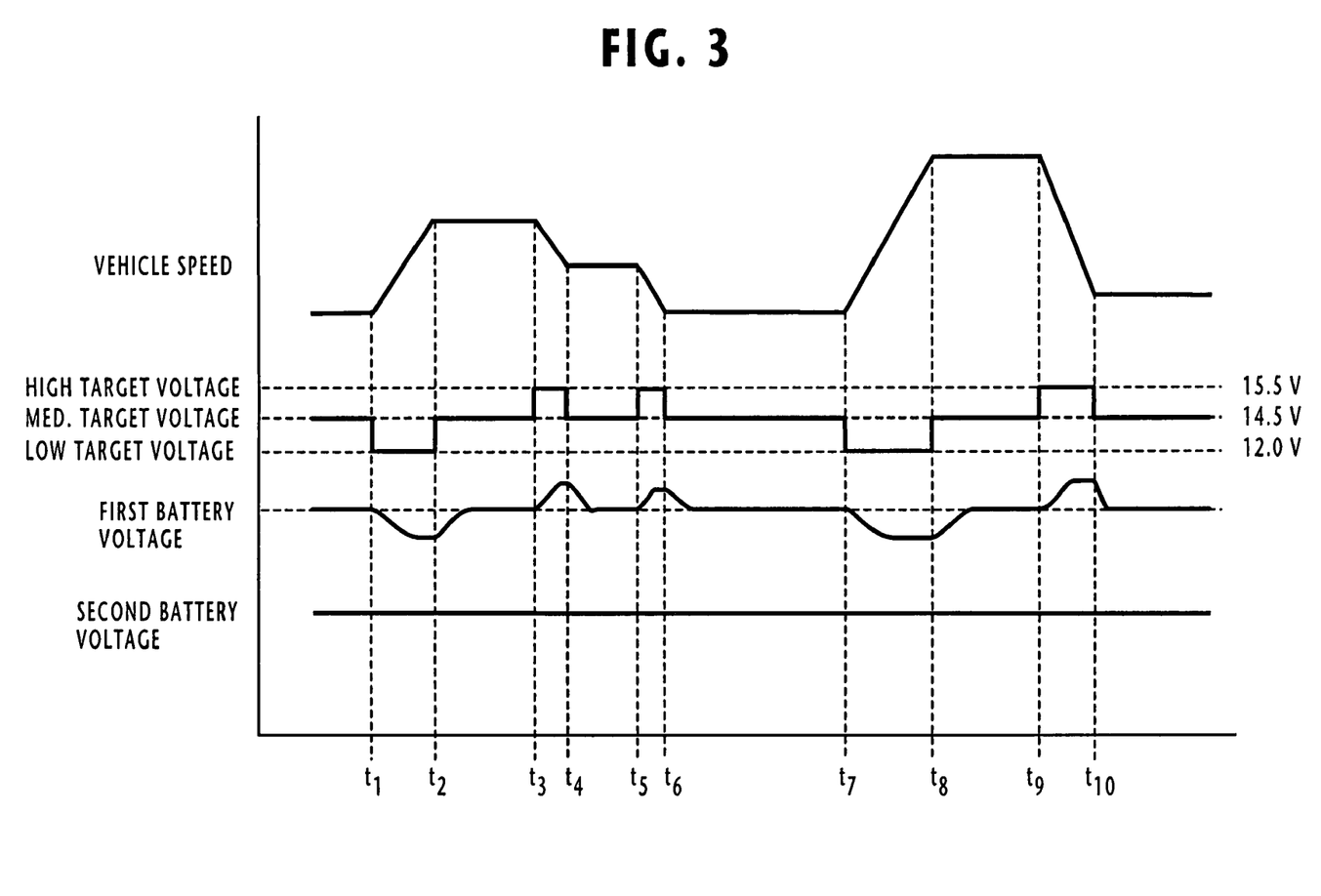
FIG. 3 is a timing diagram for describing the operation of the power supply system when electrical power consumption is relatively low.

The following is a description of the operation of the power supply system of the present invention with reference to the timing diagram of FIG. 3 when the power consumption of load 9 is lower than the specified level (step 101) and the power conversion circuitry is operated in the normal power conversion mode (first mode) (step 102).

Initially, the vehicle is driven at a cruising speed and the generator output voltage is maintained at the medium target level.

Figure 4:
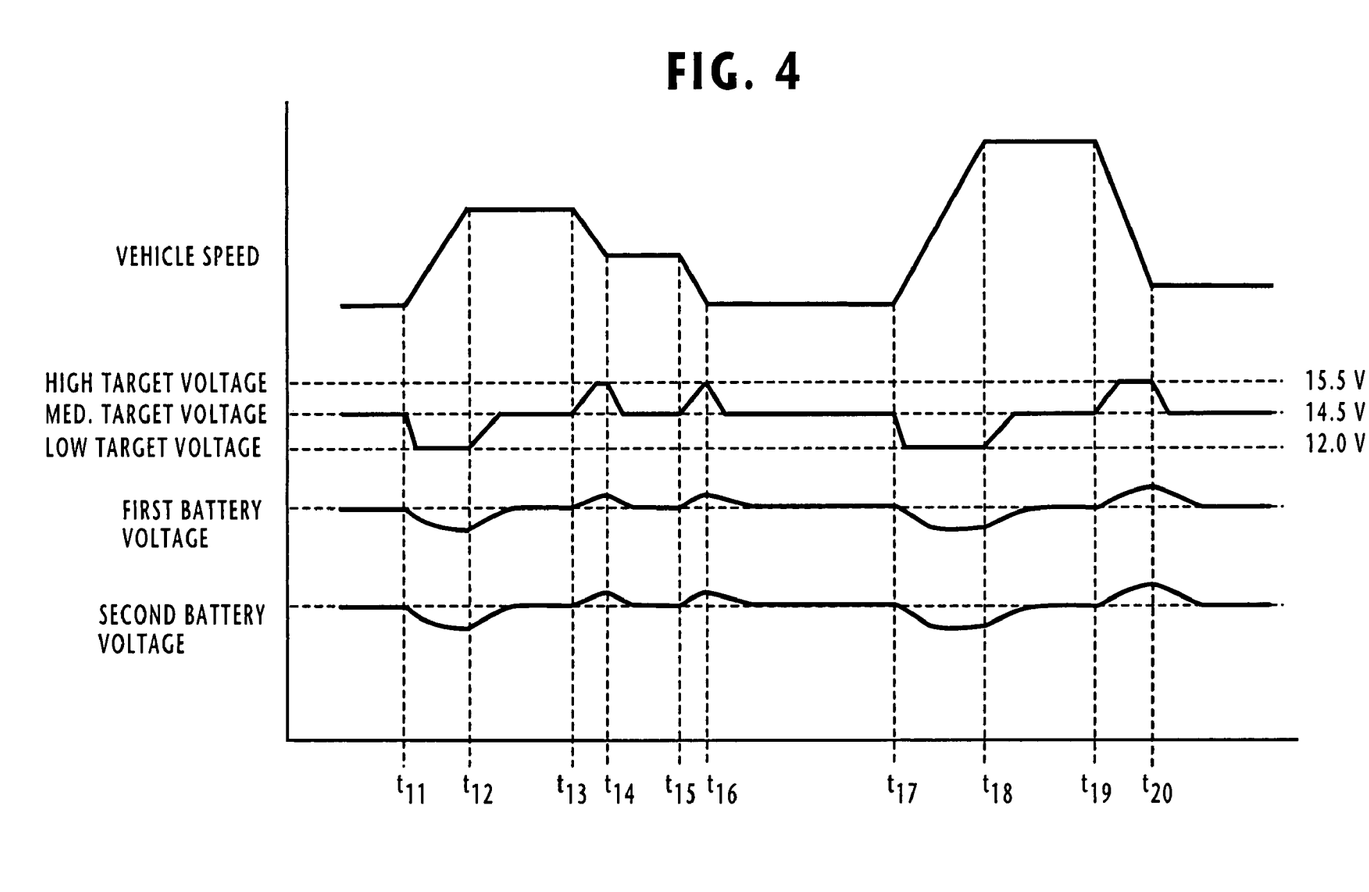
FIG. 4 is a timing diagram for describing the operation of the power supply system when electrical power consumption is relatively high.

When the vehicle is accelerated during period $t_1$ to $t_2$ (step 103), the system controller 7 controls the voltage regulator 6 so that the generator 5 stops generating electricity and its target voltage is set at the low level of 12 volts (step 104). As a result, the input voltage of DC-DC converter 3 is equal to the voltage of battery 1, and this voltage gradually decreases from the medium target level to the low target level, as shown in FIG. 4.

During period $t_2$ to $t_3$, the vehicle is run at cruising speed. Generator 5 is activated (steps 105, 108) to set the target voltage to the medium level (14.5 volts). The voltage of the battery 1 gradually increases until it reaches the medium target level.

During period $t_3$ to $t_4$, the vehicle is decelerated. Generator 5 is controlled (steps 103, 106) to set its target voltage to the high level (15.5 volts). The battery 1 voltage gradually increases from the medium target level until it reaches the high target level.

During period $t_4$ to $t_5$, the vehicle is operated at cruising speed. Generator 5 is controlled (steps 107, 108) to set its target voltage to the medium level. The battery 1 voltage gradually decreases from the high level until it reaches the medium level.

During period $t_5$ to $t_6$, the vehicle is decelerated again. Generator 5 is controlled (steps 103, 106) to set its target voltage to the high level. The battery 1 voltage gradually increases from the medium level until it reaches the high level. Similar events occur during subsequent periods.

It is seen that when the vehicle is decelerated, the generator 5 is activated to increase its output voltage. This activation of generator 5 is to take advantage of regenerative braking effect by converting the momentum of the vehicle to electrical energy and returning this recaptured energy to the battery 1. When the vehicle is accelerated, the generator 5 is inactivated to stop generating electricity. This inactivation of generator 5 is to reduce the fuel consumption and the emission of noxious gases by using the recaptured electrical energy.

When the output of generator 5 is sharply varied under control of the system controller 7, the voltage at the second battery 2 may vary correspondingly. However, due to the low electrical power consumption, the voltage of the battery 2 varies within the adaptive control range of the power converter 3. Therefore, when the power converter 3 detects when its output voltage deviates from a reference level, it controls the duty ratio of its switching transistor 31 according to the difference between the two voltages so that the deviation is reduced to substantially to zero. In this way, the voltage at the battery 2 is maintained at a substantially constant level as shown in FIG. 3.

The following is a description of the operation of the power supply system with reference to FIG. 4 when the power consumption of load 9 is higher than the specified level and the power conversion circuitry is set in the straight-circuit mode (step 101).

Initially, the vehicle is driven at cruising speed. During this initial period prior to time $t_{11}$, the generator output voltage is maintained at the medium target level 14.5 volts, and the voltages of batteries 1 and 2 are both maintained at the medium target level.

When the vehicle is accelerated during period $t_{11}$ to $t_{12}$ (step 111), the system controller 7 controls the voltage regulator 6 so that the generator 5 gradually decreases its output voltage until it reaches the low target level of 12 volts (step 112). As a result, the voltages at the batteries 1 and 2 gradually decrease simultaneously from the medium target level to the low target level, as shown in FIG. 4.

During period $t_{12}$ to $t_{13}$, the vehicle is cruising and the generator 5 is controlled (steps 113, 116) to gradually increase its output voltage from the low target level to the medium target level (14.5 volts). The voltages of batteries 1 and 2 gradually increase from the low target level until they reach the medium target level.

During period $t_{13}$ to $t_{14}$, the vehicle is decelerated and the generator 5 is controlled (steps 111, 114) to gradually increase its output voltage from the medium target level to the high target level (15.5 volts). The voltages of batteries 1 and 2 gradually increase from the medium target level to the high target level.

During period $t_{14}$ to $t_{15}$, the vehicle is driven at cruising speed and the generator 5 is controlled (steps 115, 116) to gradually decrease its output voltage from the high target level until it reaches the medium target level. The voltages of batteries 1 and 2 gradually decrease from the high target level until they reach the medium target level.

During period $t_{15}$ to $t_{16}$, the vehicle is decelerated again. Generator 5 is controlled (steps 111, 114) to gradually increase its output voltage from the medium target level to the high target level. The voltages of batteries 1 and 2 gradually increase from the medium level. Similar events occur during subsequent periods.

Since the output of generator 5 is directly coupled to the battery 2, the power converter 3 does not function as a "voltage stabilizer" as in the case of FIG. 3. However, the gradual variation of the generator voltage each time the vehicle changes its speed has the effect of reducing the overall variation rate of the voltage at the battery 2. In a preferred embodiment, the voltage generated by the automotive generator 5 is varied at a rate of 1 volt per second. Specifically, this voltage variation is achieved by controlling the field current of the generator 5. Alternatively, the on-off duty ratio of the generator's switching transistor (not shown) may be used to control the variation rate of the generated voltage.

In addition, during the straight-circuit mode, the electrical energy recaptured when the vehicle is decelerated is drained to the load circuit 9, not returned to the battery 1 for power saving purpose for use during acceleration. Although the reduction of fuel consumption and emission of noxious gases is not so great during the straight-circuit mode as that of the power conversion mode, overall improvement can still be achieved.

Further, the dual-mode power conversion of the present invention advantageously allows compact design for a small-sized power converter that is low-cost and low-loss, enabling it to be easily installed in a cramped area and easily cooled. More specifically, the rated capacity of the power converter 3 can be reduced to ½ or less of the rated capacity of the generator 5.

Figure 5:
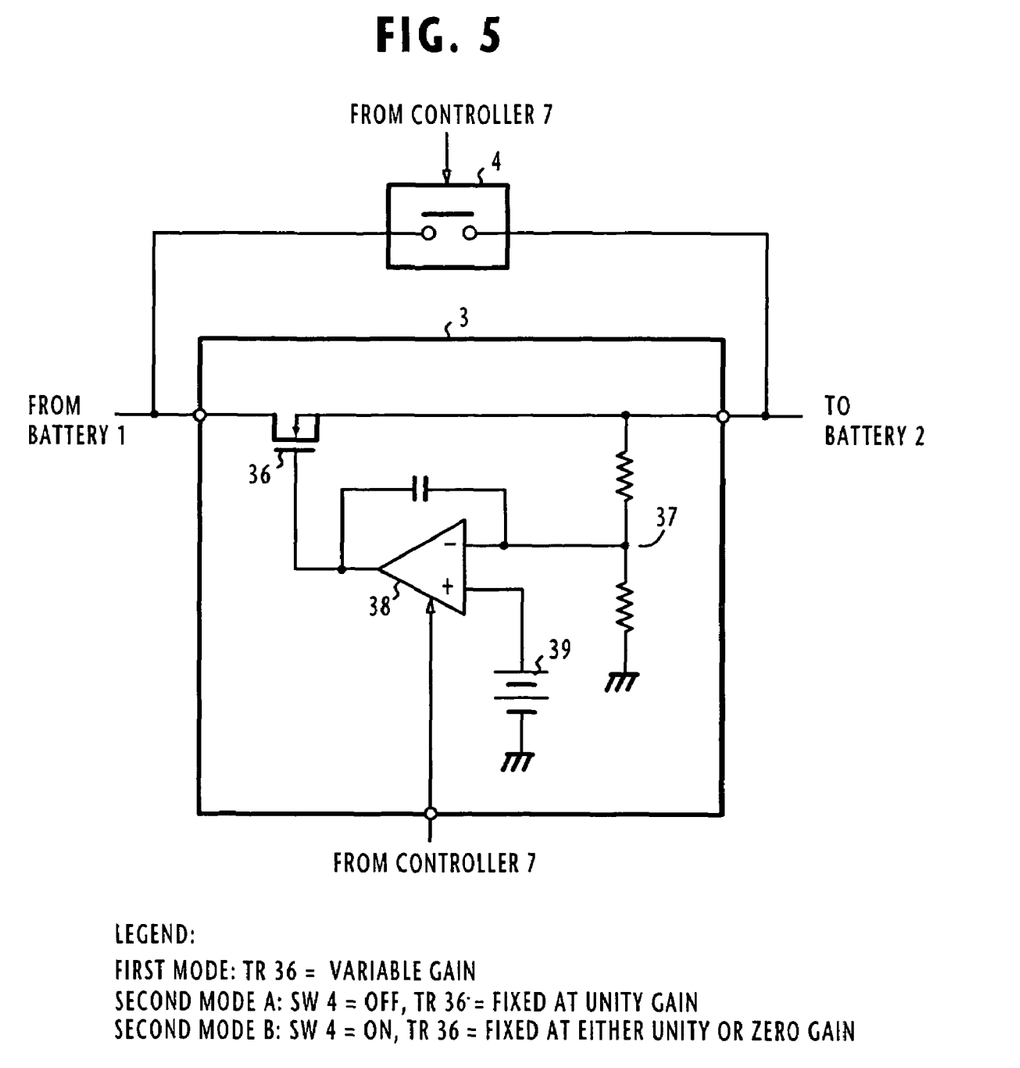
FIG. 5 is a block diagram of another embodiment of the present invention.

FIG. 5 shows another example of the power converter 3. In this example, a power transistor 36 is provided, which operates in a non-saturated, linear amplification mode to serve as a "variable resistance" between the batteries 1 and 2. An operational amplifier 38 drives the gate of the power transistor 36 according to a voltage difference between a reference voltage source 39 and a voltage divider 37 connected to the battery 2. Due to the absence of switching noise as in the case of the example shown in FIG. 2, this type of power converter is favorable in terms of electromagnetic compatibility and reduced size.

As in the previous embodiment, when the load power consumption is lower than the specified value, the system controller 7 sets the power conversion circuitry in the power conversion mode by setting the switch 4 in the OFF position and setting the power converter 3 in the normal power conversion mode. When the load power consumption is higher than the specified value, the system controller 7 sets the power conversion circuitry in the straight-circuit mode using one of the following alternative settings:

3) Switch 4=OFF and transistor 36=fixed at unity gain; and
4) Switch 4=ON and transistor 36=fixed at unity or zero gain.

With the alternative setting (3), the switch 4 is turned OFF and transistor 36 is fixed at unity gain to allow passage of DC current from the battery 1 to the battery 2. With the alternative setting (4), the switch 4 is turned ON and transistor 36 is either fixed at unity gain or zero gain. If the transistor 36 is fixed at unity gain in the alternative setting (4), parallel current flows through the switch 4 and the power converter 3. If the transistor 36 is fixed at zero gain in the alternative setting (4), current flows only through the switch 4.

While mention has been made of embodiments in which lead-acid battery is used for the source battery 1, a lithium battery may also be used instead. In comparison with a lead-acid battery, a lithium battery has a lower internal resistance, which allows it to be quickly charged by the generator with low energy loss following vehicle acceleration.

What is claimed is:

1. A power supply system mounted on a vehicle, comprising:
   a first storage battery;
   an automotive generator for generating a voltage and charging said first storage battery with the generated voltage;
   a second storage battery connected to an electrical load;
   power conversion circuitry having a power converter including a semiconducting switching device connected between said first storage battery and said second storage battery, said power conversion circuitry being operable in a first mode in which a voltage at said second storage battery is maintained at a substantially constant level and in a second mode in which the voltage at said second storage battery varies with a voltage at said first storage battery;
   control circuitry for controlling a power transistor according to the voltage at said second storage battery when said power conversion circuitry is operating in said first mode and continuously setting said semiconducting switching device in a conducting state when said power conversion circuitry is operating in said second mode; and
   a controller for operating said power conversion circuitry in said first mode when power consumption of said electrical load is lower than a specified value and controlling said generator so that the generated voltage undergoes a transition at a first rate, and operating said power conversion circuitry in said second mode when power consumption of said electrical load is higher than said specified value and controlling said generator so that said generated voltage undergoes a transition at a second rate lower than said first rate.

2. The power supply system of claim 1, wherein said power converter further comprises a switch connected in parallel with said power converter,
   wherein said control circuitry controls the semiconducting switching device according to the voltage at said second storage battery when said power conversion circuitry is operating in said first mode and continuously setting said semiconducting switching device in one of conducting and nonconducting states when said power conversion circuitry is operating in said second mode; and
   wherein said controller is arranged to set the switch in a nonconducting state when said power conversion circuitry is operating in said first mode and in a conducting state when said power conversion circuitry is operating in said second mode.

3. The power supply system of claim 1, wherein said controller is responsive to a speed variation of said vehicle for controlling said generator so that said generated voltage decreases when said vehicle is accelerated and increases when said vehicle is decelerated.

4. The power supply system of claim 1, wherein said power converter has a rated capacity that is ½ or less than a rated capacity of said generator.

5. The power supply system of claim 1, wherein said controller performs variable setting of said generated voltage by controlling a target voltage of said generator.

6. The power supply system of claim 1, wherein said controller performs variable setting of said generated voltage by controlling a field current of said generator.

7. The power supply system of claim 1, wherein said first storage battery has a rated voltage that is higher than a rated voltage of said second storage battery.

8. The vehicle-mounted power supply system of claim 2, wherein the control circuitry of said power converter controls said semiconducting switching device in a pulse-width modulation mode according to the voltage at said second storage battery.

9. The power supply system of claim 2, wherein said control circuitry of said power converter controls said semiconducting switching device in a non-saturated mode according to the voltage at said second storage battery.

10. The power supply system of claim 1, wherein said second rate is equal to 1 volt per second.

11. The power supply system of claim 1,
    wherein, when said power conversion circuitry is operating in said first mode, said controller controls said generator so that the generated voltage is set at a lower target level when said vehicle is under acceleration, controls said generator so that the generated voltage is set at a higher target level when said vehicle is under deceleration, and controls said generator so that the generated voltage is set a medium target level between said higher and lower target levels when said vehicle changes its speed either from acceleration or deceleration to cruising, and
    wherein, when said power conversion circuitry is operating in said second mode, said controller controls said generator so that the generated voltage gradually decreases until it reaches said lower target level when said vehicle is under acceleration, controls said generator so that the generated voltage gradually increases until it reaches said higher target level when said vehicle is under deceleration, and controls said generator so that the generated voltage gradually varies until it reaches said medium target level when said vehicle changes its speed either from acceleration or deceleration to cruising.

12. A method of operating a power supply system mounted on a vehicle, wherein the system comprises a first storage battery, an automotive generator for generating a voltage for charging said first storage battery, a second storage battery connected to an electrical load and power conversion circuitry connected between said first storage battery and said second storage battery, the method comprising the steps of:
    a) operating said power conversion circuitry in a first mode when power consumption of said electrical load is lower than a specified value so that a voltage at said second storage battery is substantially maintained at a constant level and operating the power conversion circuitry in a second mode when said power consumption is higher than said specified value so that said voltage at said second storage battery varies with a voltage at said first storage battery;
    b) controlling said automotive generator so that the generated voltage undergoes a transition at a first rate when said power conversion circuitry is operating in said first mode and undergoes a transition at a second rate lower than said first rate when said power conversion circuitry is operating in said second mode,
    wherein when the power conversion circuitry is operating in said first mode, step (b) further comprises the steps of:
        controlling said generator so that the generated voltage is set at a lower target level when said vehicle is under acceleration;
        controlling said generator so that the generated voltage is set at a higher target level when said vehicle is under deceleration; and
        controlling said generator so that the generated voltage is set at a medium target level between said higher and lower target levels when said vehicle changes speed either from acceleration or deceleration to cruising, and
    wherein, when the power conversion circuitry is operating in said second mode, step (b) comprises the steps of:
        controlling said generator so that the generated voltage gradually decreases until it reaches said lower target level when said vehicle is under acceleration;
        controlling said generator so that the generated voltage gradually increases until it reaches said higher target level when said vehicle is under deceleration; and
        controlling said generator so that the generated voltage gradually varies until it reaches said medium target level when said vehicle changes speed either from acceleration or deceleration to cruising.

* * * * *